(12) United States Patent
Kim et al.

(10) Patent No.: US 11,261,952 B2
(45) Date of Patent: Mar. 1, 2022

(54) MAGNET GEAR DEVICE

(71) Applicant: SL Corporation, Daegu (KR)

(72) Inventors: Sungjin Kim, Gyeongsangbuk-do (KR); Chunnyung Heo, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/915,256

(22) Filed: Jun. 29, 2020

(65) Prior Publication Data

US 2021/0071746 A1    Mar. 11, 2021

(30) Foreign Application Priority Data

Sep. 9, 2019    (KR) .......................... 10-2019-0111579

(51) Int. Cl.
*F16H 49/00*    (2006.01)

(52) U.S. Cl.
CPC .................................. *F16H 49/005* (2013.01)

(58) Field of Classification Search
CPC ... F16H 49/005; H02K 49/102; H02K 49/108
USPC ........................................................ 310/103
See application file for complete search history.

(56) References Cited

U.S. PATENT DOCUMENTS

| | | | | |
|---|---|---|---|---|
| 2,722,617 | A | * | 11/1955 | Cluwen ................ H02K 49/102 310/103 |
| 6,054,788 | A | * | 4/2000 | Dombrovski .......... H02K 49/00 310/103 |
| 2011/0031837 | A1 | * | 2/2011 | Kuritani .............. F04C 15/0069 310/103 |

* cited by examiner

*Primary Examiner* — Victor L MacArthur
(74) *Attorney, Agent, or Firm* — United One Law Group LLC; Kongsik Kim; Jhongwoo Peck

(57) ABSTRACT

A magnet gear device includes a first magnet unit in which two or more magnetic poles are alternately arranged in a direction along a rotation axis and a circumferential direction with respect to the rotation axis, respectively; a second magnet unit in which two or more magnetic poles are alternately arranged in the direction along the rotation axis and the circumferential direction, respectively, wherein the second magnet unit is disposed radially outside the first magnet unit; and a pole piece unit including a plurality of pole pieces to form a magnetic flux path between the first magnet unit and the second magnet unit. Each of the plurality of pole pieces is formed to extend in a radial direction to allow each of both an inner end and an outer end thereof to overlap at least a portion of the first magnet unit and the second magnet unit.

11 Claims, 12 Drawing Sheets

MAGNET GEAR DEVICE

CROSS-REFERENCE TO RELATED APPLICATION

This application claims priority from Korean Patent Application No. 10-2019-0111579 filed on Sep. 9, 2019, the contents of which in their entirety are herein incorporated by reference.

BACKGROUND

1. Technical Field

The present disclosure relates to a magnetic gear device, and more particularly, to a magnetic gear device that enables power transmission by a non-contact gear transmission manner.

2. Description of the Related Art

Generally, a power transmission system uses a contact gear transmission manner that involves mechanical contact. Since the contact gear transmission manner includes a plurality of gears engaged with each other, not only noise is generated when a gear is rotated, but mechanical wear is also caused.

A magnetic gear is an example of a non-contact gear transmission manner, and the magnetic gear that transmits power in a non-contact manner using a magnetic force, has been developed and used. In the non-contact gear transmission manner, power transmission is possible without friction caused by mechanical contact, and thus, there is little noise or wear, and stability and durability are increased. Therefore, research for power transmission systems using magnet gears is being actively conducted.

The magnet gear generally includes an input side rotor, an output side rotor, and a pole piece that allows a magnetic flux path to be formed between the input side rotor and the output side rotor. A method for improving a transmission torque between the input side rotor and the output side rotor by enabling stable flow of magnetic flux between the input side rotor and the output side rotor has been studied. Further, a method for miniaturizing has been studied.

SUMMARY

Aspects of the present disclosure provide a magnet gear device capable of miniaturization by arranging a plurality of magnet units to have a concentric configuration, and forming a pole piece that extends in a radial direction with respect to a rotation axis between the plurality of magnet units. Aspects of the present disclosure also provide a magnetic gear device capable of improving a transmission torque while reducing a weight by designing a pole piece to improve the saturation issue that occurs at an area where a magnetic flux is concentrated in the pole piece. Advantages of the present disclosure are not limited to the above-mentioned, and other advantages not mentioned may be clearly understood by a person skilled in the art from the following description.

According to an aspect of the present disclosure, a magnet gear device may include a first magnet unit in which two or more magnetic poles are alternately arranged in a direction along a rotation axis and a circumferential direction with respect to the rotation axis, respectively; a second magnet unit in which two or more magnetic poles are alternately arranged in the direction along the rotation axis and the circumferential direction, respectively, wherein the second magnet unit is disposed radially outside of the first magnet unit along an outer circumference of the first magnet unit; and a pole piece unit including a plurality of pole pieces to form a magnetic flux path between the first magnet unit and the second magnet unit. Each of the plurality of pole pieces may be formed to extend in a radial direction with respect to the rotation axis to allow each of an inner end and an outer end thereof overlaps at least a portion of the first magnet unit and the second magnet unit.

Each of the plurality of pole pieces may comprise a pair of magnetic bodies that extend in the radial direction with respect to the rotation axis, and the pair of magnetic bodies may be disposed on both sides of the first magnet unit and the second magnet unit in the direction along the rotation axis, respectively.

Each of the plurality of pole pieces may have a shape defined with respect to a predetermined angular range about the rotation axis. A circumferential width between both circumferential sides of each of the plurality of pole pieces may be smaller at the inner end proximate to the rotation axis of the both ends than the outer end distant from the rotation axis. The circumferential width between the both circumferential sides of each of the plurality of pole pieces may gradually increase from the inner end proximate to the rotation axis to the outer end distant from the rotation axis. The circumferential width between the both circumferential sides of each of the plurality of pole pieces may increase from the inner end to a middle portion and from the outer end to the middle portion. At least one step may be formed in each of the plurality of pole pieces to allow the circumferential width between the both circumferential sides to have a stepwise increase going from both the inner end and the outer end to the middle portion.

Both circumferential sides of each of the plurality of pole pieces may be formed to correspond to boundary lines of both sides of the angular range. Alternatively, a portion of both circumferential sides of each of the plurality of pole pieces may be formed to correspond to boundary lines of both sides of the angular range, and another portion thereof may be formed to be offset from the boundary lines of the both sides of the angular range, in the circumferential direction. At the inner end and the outer end, both circumferential sides of each of the plurality of pole pieces may be disposed inside the angular range with respect to the boundary lines of the both sides of the angular range, and a first part of the middle portion of each of the plurality of pole pieces may be formed to correspond to the boundary lines of the both sides of the angular range, and a second part thereof may be formed to protrude circumferentially outward with respect to the boundary lines of the both sides of the angular range.

Each of the plurality of pole pieces may be formed such that both circumferential sides thereof are symmetrical with respect to a center line of the angular range. Each of the plurality of pole pieces may have a higher magnetic flux density at a middle portion than both the inner end and the outer end.

A magnetic gear device according to the present disclosure has one or more of the following benefits. Since a plurality of magnet units are arranged in a concentric configuration, and a pole piece that allows a magnetic flux path to be formed between the plurality of magnet units are arranged to extend in a radial direction with respect to a rotation axis, it is possible to implement the magnet gear device in a slimmer form factor, which is advantageous in miniaturization. Moreover, by removing material at a low magnetic flux density area from a pole piece and expanding a high magnetic flux density area, a transmission torque may be improved due to an improved magnetic flux flow while the overall weight may be reduced.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
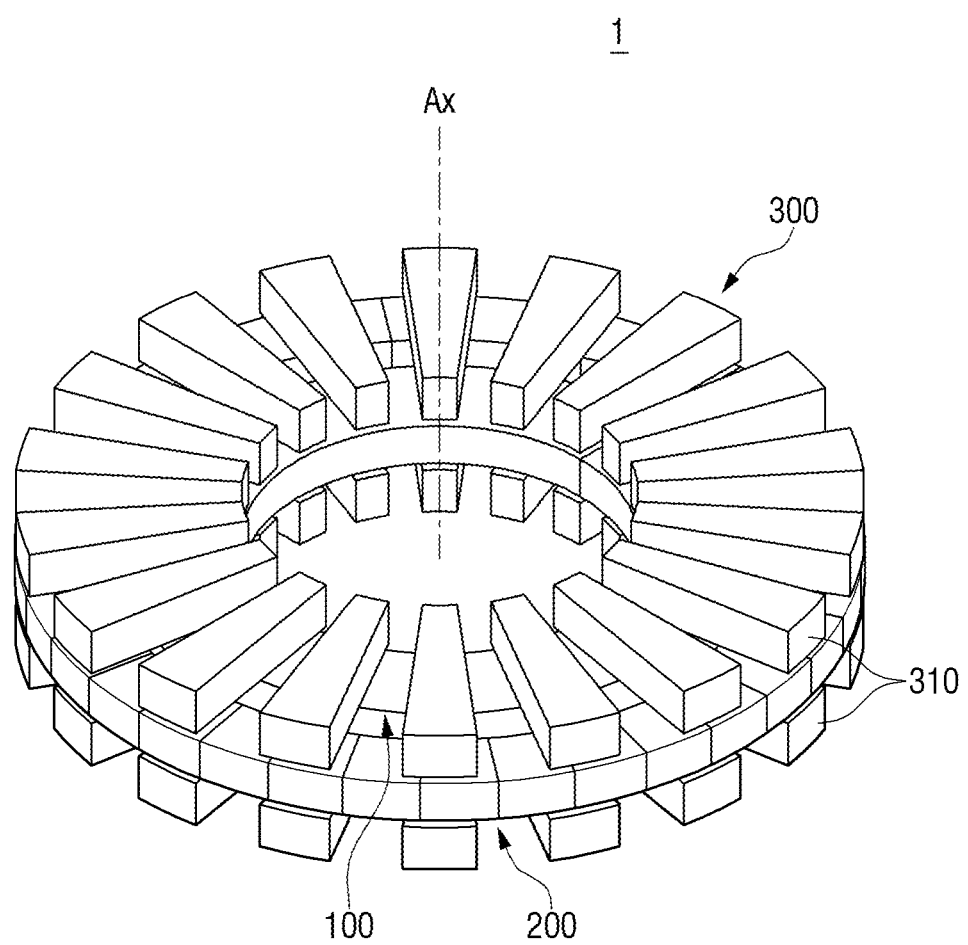
FIG. 1 is a perspective view showing a magnet gear device according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a magnet gear device according to exemplary embodiments of the present disclosure.

Figure 2:
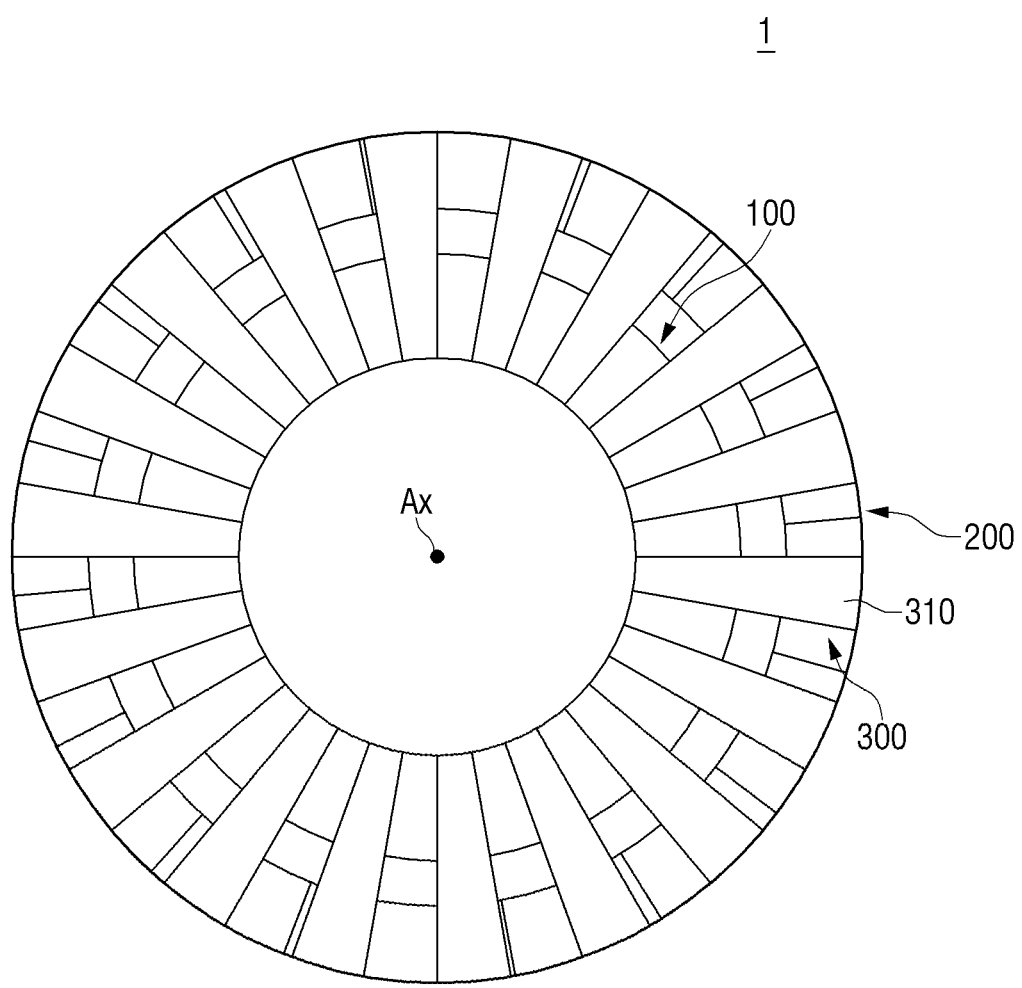
FIG. 2 is a plan view showing the magnet gear device according to the exemplary embodiment of the present disclosure.
Figure 3:
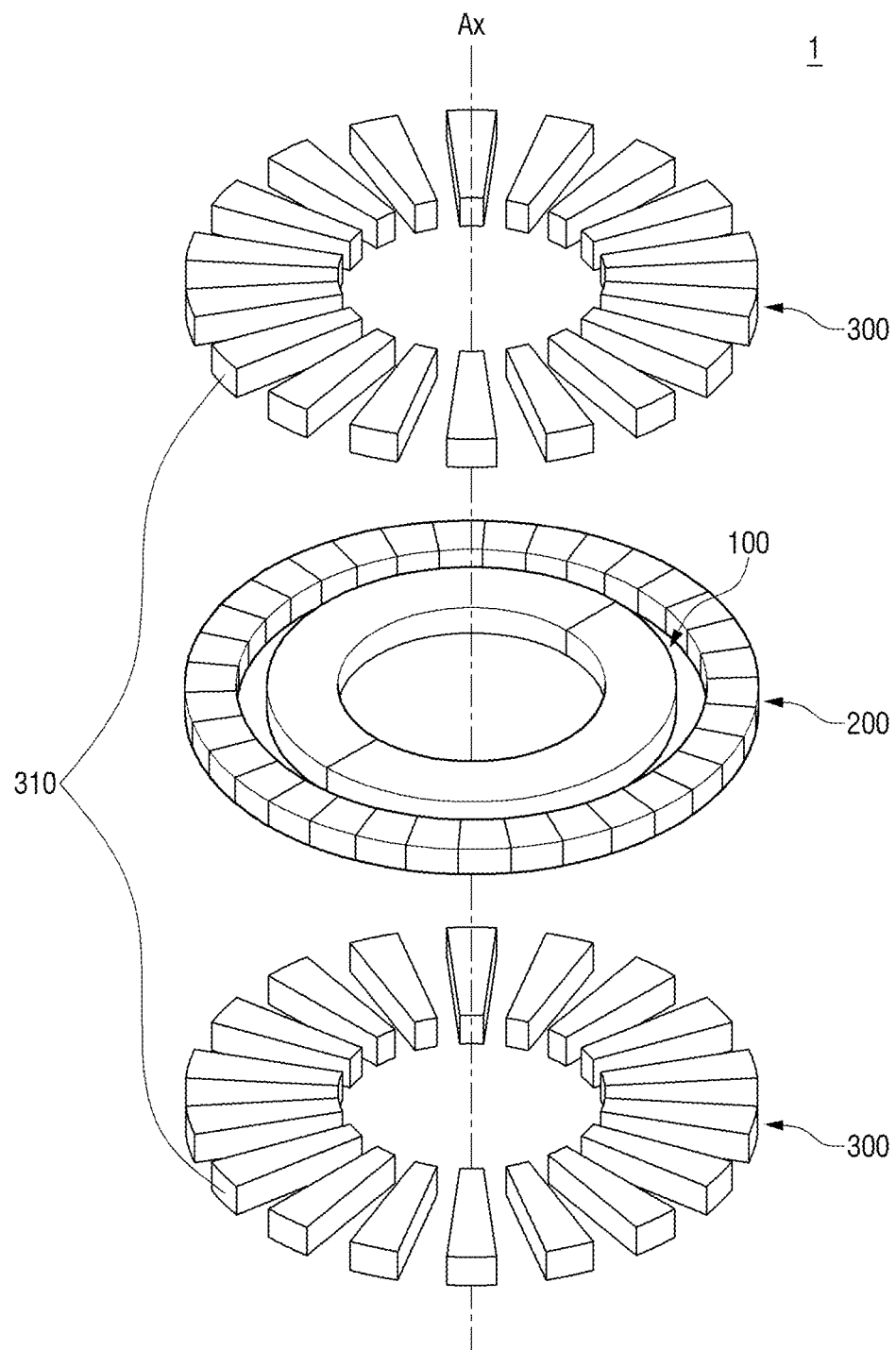
FIG. 3 is an exploded perspective view showing the magnet gear device according to the exemplary embodiment of the present disclosure.
Figure 4:
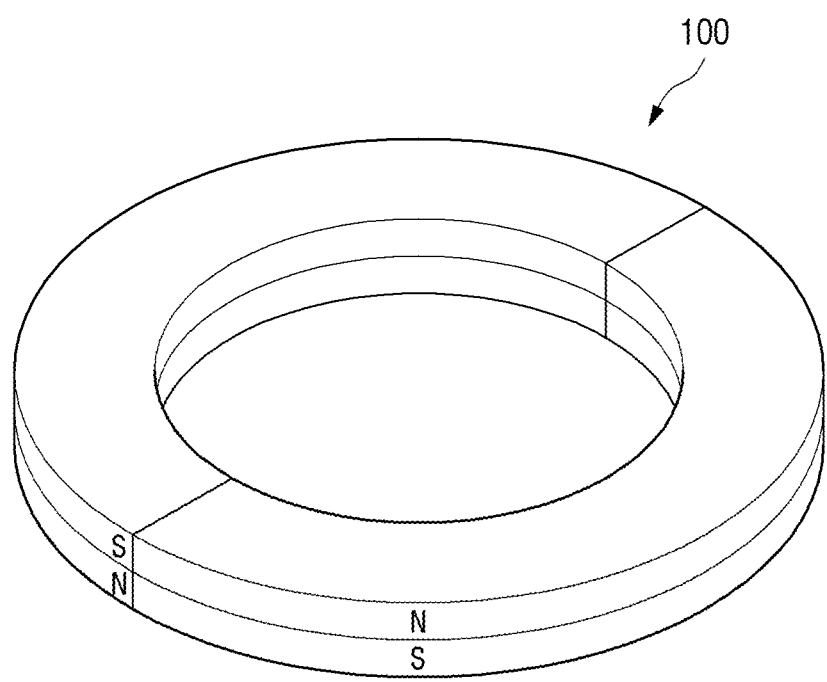
FIG. 4 is a perspective view showing a first magnet unit according to the exemplary embodiment of the present disclosure.
Figure 5:
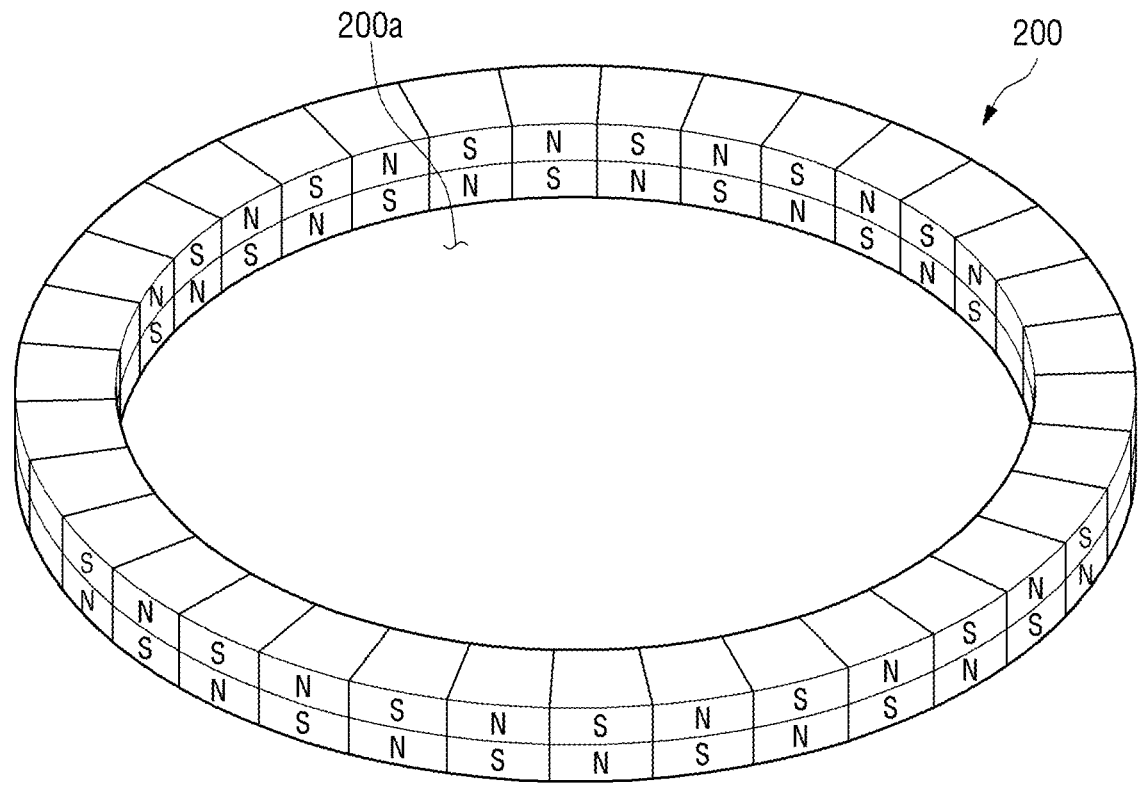
FIG. 5 is a perspective view showing a second magnet unit according to the exemplary embodiment of the present disclosure.

FIG. 1 is a perspective view showing a magnet gear device according to an exemplary embodiment of the present disclosure. FIG. 2 is a plan view showing the magnet gear device according to the exemplary embodiment of the present disclosure. FIG. 3 is an exploded perspective view showing the magnet gear device according to the exemplary embodiment of the present disclosure. FIG. 4 is a perspective view showing a first magnet unit according to the exemplary embodiment of the present disclosure. FIG. 5 is a perspective view showing a second magnet unit according to the exemplary embodiment of the present disclosure.

Referring to FIGS. 1 to 5, the magnet gear device 1 according to the exemplary embodiment of the present disclosure may include a first magnet unit 100, a second magnet unit 200, and a pole piece unit 300. In the exemplary embodiment of the present disclosure, the magnet gear device 1 may be used in various devices that require speed reduction or increase according to a gear transmission ratio between the first magnet unit 100 and the second magnet unit 200.

In addition, in the magnet gear device 1 of the exemplary embodiment of the present disclosure, the first magnet unit 100 may be an input side rotor, the second magnet unit 200 may be an output side rotor, and the second magnet unit 200 may be rotated at an increased or decreased speed depending on a transmission torque transmitted by the pole piece unit 300. In the exemplary embodiment of the present disclosure, it is described as an example where the first magnet unit 100 may be an input side rotor and the second magnet unit 200 may be an output side rotor. However, the configuration of the input side and the output side is not limited thereto. Depending on a gear transmission ratio or transmission torque, one of the first magnet unit 100, the second magnet unit 200, and the pole piece unit 300 may be an input side rotor, and another one may be an output-side rotor.

Two or more magnetic poles may be alternately arranged in the first magnet unit 100 in a direction of a rotation axis Ax and in a direction of rotation about the rotation axis Ax (hereinafter referred to as "a circumferential direction"), respectively. In the exemplary embodiment of the present disclosure, two magnetic poles may be arranged in the first magnet unit 100 in the direction of the rotation axis Ax. However, the present disclosure is not limited thereto, and the number of magnetic poles arranged in the direction of the rotation axis Ax may be changed.

The second magnet unit 200 may be rotated about the same rotation axis Ax as the first magnet unit 100. Two or more magnetic poles may be alternately arranged in the second magnet unit 200 in the direction of the rotation axis Ax and the circumferential direction along an outer circumference of the first magnet unit 100.

In the exemplary embodiment of the present disclosure, the first magnet unit 100 and the second magnet unit 200 may have a concentric configuration. In this case, a hollow 200a in which the first magnet unit 100 may be received and disposed may be formed in the second magnet unit 200 to allow the first magnet unit 100 and the second magnet unit 200 to rotate about the same rotation axis (Ax).

As described above, compared to a case where the first magnet unit 100 and the second magnet unit 200 are arranged in the direction of the rotation axis Ax (e.g., an axial arrangement), when the first magnet unit 100 and the second magnet unit 200 have a concentric configuration, and are rotated about the same rotation axis Ax, a space occupied by the first magnet unit 100 and the second magnet unit 200 may be reduced, which is advantageous for miniaturization.

When two or more magnetic poles are alternately arranged in each of the first magnet unit 100 and the second magnet unit 200, the total number of magnetic poles including an N pole and an S pole may be two or more, and the N and S poles may be alternately arranged. For example, when two or more magnetic poles are alternately arranged in the direction along the rotation axis Ax (e.g., an axial direction) and the circumferential direction, respectively, it may be understood as it is arranged in the order of N-pole, S-pole, N-pole, S-pole, and so on or S-pole, N-pole, S-pole, N-pole, and so on. The gear transmission ratio of the magnet gear device 1 of the present disclosure may be determined depending on the number of magnetic poles arranged in the circumferential direction in the first magnet unit 100 and the number of magnetic poles arranged in the circumferential direction in the second magnet unit 200.

The pole piece unit 300 may form a magnetic flux path between the first magnet unit 100 and the second magnet unit 200. The pole piece unit 300 may include a plurality of pole pieces 310 made of a material having a high magnetic permeability. The plurality of pole pieces 310 may be arranged to have a uniform angular interval in the circumferential direction about the rotation axis Ax.

In the exemplary embodiment of the present disclosure, each of the plurality of pole pieces 310 may include a pair of magnetic bodies positioned on both sides of the first magnet unit 100 and the second magnet unit 200 in the direction of the rotation axis Ax to allow the magnetic flux path to be formed between the first magnet unit 100 and the second magnet unit 200. In particular, the pair of magnetic bodies may have the same shape and difference only in position thereof.

Each of the plurality of pole pieces 310 may be formed to extend in a radial direction with respect to the rotation axis Ax to allow both ends thereof may be disposed to overlap at least a portion of the first magnet unit 100 and the second magnet unit 200 in the radial direction with respect to the rotation axis Ax. In other words, in the exemplary embodiment of the present disclosure, the first magnet unit 100 and the second magnet unit 200 may have a concentric configuration, the first magnet unit 100 may be disposed inside the second magnet unit 200, and they may be disposed to rotate about the same rotation axis Ax. Therefore, each of the plurality of pole pieces 310 may be formed to extend in the radial direction with respect to the rotation axis Ax, and thus, a magnetic flux path may be formed between the first magnet unit 100 and the second magnet unit 200.

Figure 6:
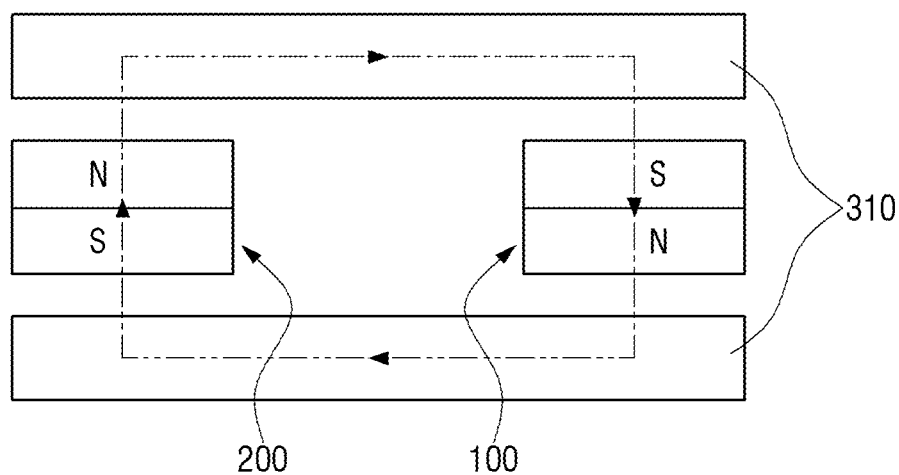
FIG. 6 is a schematic view showing a magnetic flux path of the magnet gear device according to the exemplary embodiment of the present disclosure.

Accordingly, when each of the plurality of pole pieces 310 is formed to extend in the radial direction, two or more magnetic poles may be alternately arranged in the first magnet unit 100 and the second magnet unit 200 in the direction of the rotation axis Ax (e.g., axially). Therefore, as illustrated in FIG. 6, a magnetic flux path may be formed in the first magnet unit 100 and the second magnet unit 200 in the direction of the rotation axis Ax, and a magnetic flux path may be formed in the pair of magnetic bodies in the radial direction. As a result, a continuous magnetic flux path may be formed between the first magnet unit 100 and the second magnet unit 200.

Compared to a case where each of the plurality pole pieces 310 is formed to extend in the direction of the rotation axis Ax between the first magnet unit 100 and the second magnet unit 200, a space occupied by the magnet gear device 1 of the present disclosure may be reduced due to each of the plurality of pole pieces 310 formed to extend in the radial direction. Therefore, the overall size may be decreased.

Figure 7:
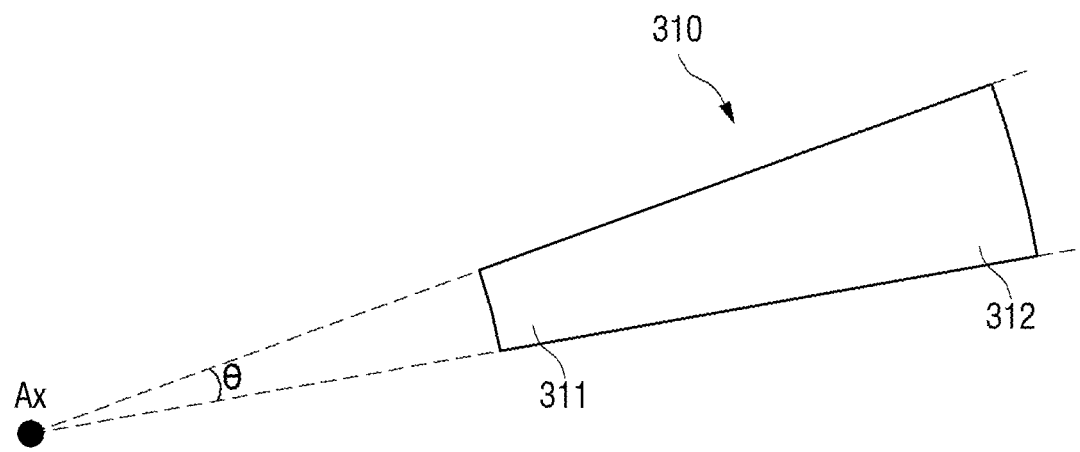
FIG. 7 is a schematic view showing a pole piece according to the exemplary embodiment of the present disclosure.

The plurality of pole pieces 310 may have a shape defined by a predetermined angular range θ about the rotation axis Ax as shown in FIG. 7. As a result, each of the plurality of pole pieces 310 may be formed such that each of the plurality of pole pieces 310 is symmetrical to both sides with respect to a center line of the angular range so that an inner end 311 thereof proximate to the rotation axis Ax may have a shorter length along the circumferential direction between both sides than an outer end 312 thereof distant from the rotation axis Ax, and both circumferential sides may be formed along boundary lines (dashed lines) on both sides of the angular range θ. Accordingly, each of the plurality of pole pieces 310 may have a shape in which a width between both circumferential sides gradually increases from the inner end 311 proximate to the rotation axis Ax to the outer end 312 distant from the rotation axis Ax.

In the exemplary embodiment as described above, circumferential sides of each of the plurality of pole pieces 310 may be formed along boundary lines of both sides of the angular range θ in the circumferential direction, thereby connecting the inner end 311 and the outer end 312. However, the present disclosure is not limited thereto, and a shape of the plurality of pole pieces 310 may be variously changed depending on a strength or ripple characteristics of a transmission torque required in the magnet gear device 1 of the present disclosure.

Figure 8:
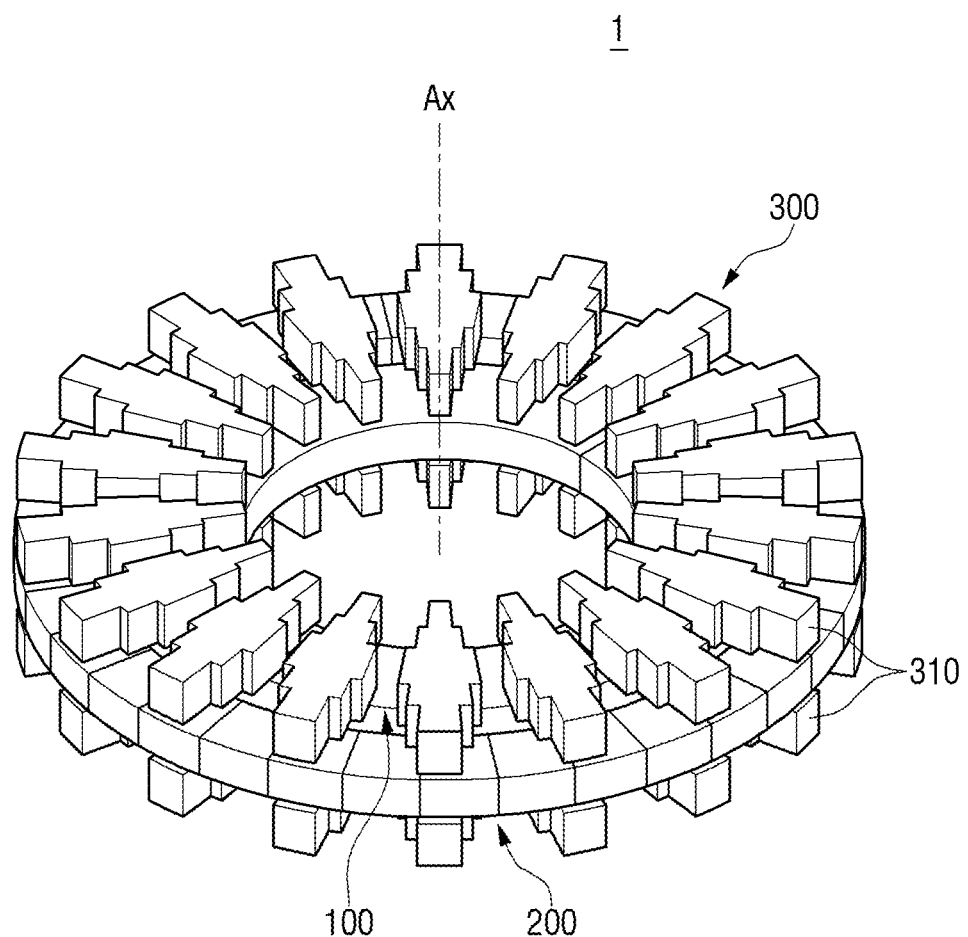
FIG. 8 is a perspective view showing a magnet gear device according to another exemplary embodiment of the disclosure.
Figure 9:
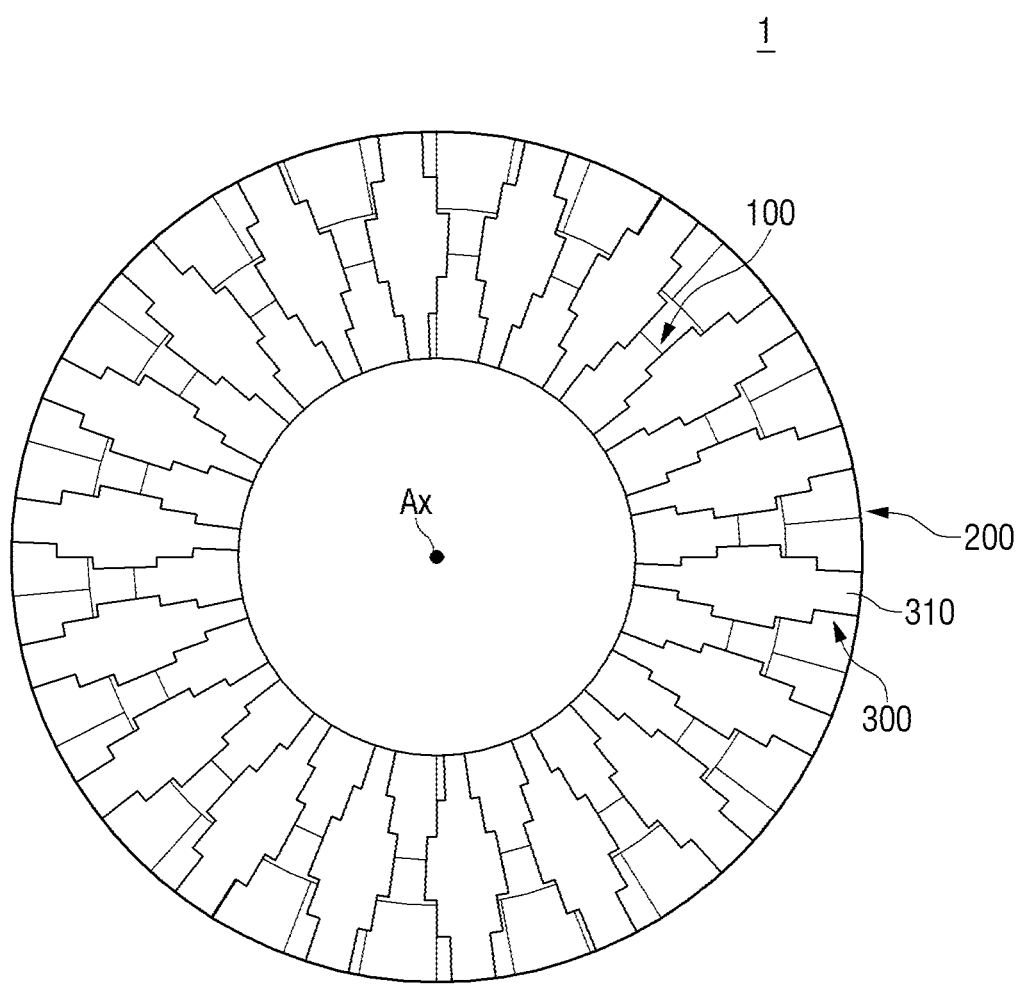
FIG. 9 is a plan view showing the magnet gear device according to the another exemplary embodiment of the present disclosure.
Figure 10:
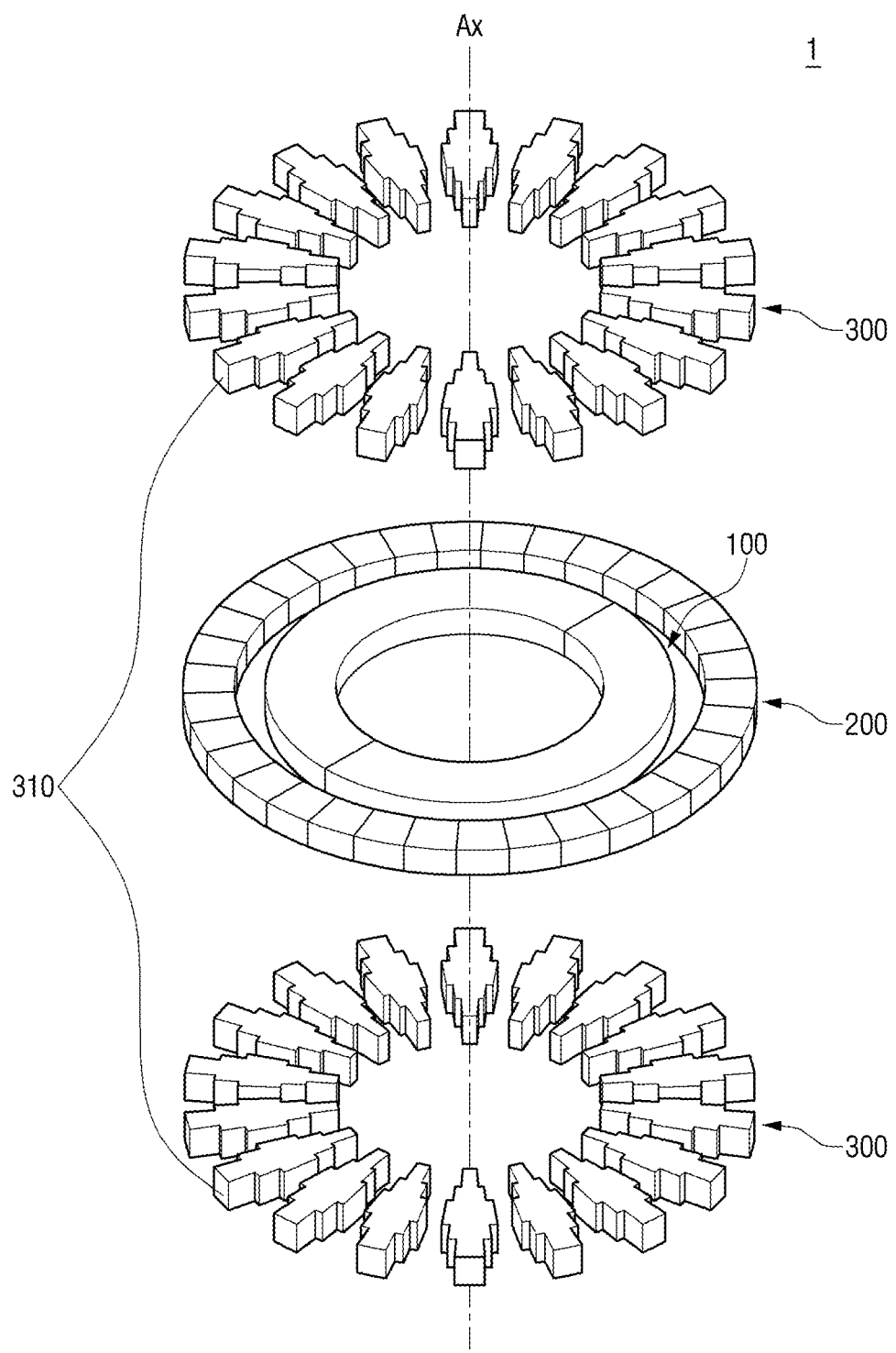
FIG. 10 is an exploded perspective view showing the magnet gear device according to the another exemplary embodiment of the present disclosure.

FIG. 8 is a perspective view showing a magnet gear device according to another exemplary embodiment of the disclosure. FIG. 9 is a plan view showing the magnet gear device according to the another exemplary embodiment of the present disclosure. FIG. 10 is an exploded perspective view showing the magnet gear device according to the another exemplary embodiment of the present disclosure.

Referring to FIGS. 8 to 10, similar to the exemplary embodiment as described above, the magnet gear device 1 according to the another exemplary embodiment of the present disclosure may include the first magnet unit 100, the second magnet unit 200, and the pole piece unit 300. In the another exemplary embodiment of the present disclosure, components having the same function as the exemplary embodiment as described above will use the same reference numerals, and detailed description of the functions will be omitted.

In the another exemplary embodiment of the present disclosure, the pole piece unit 300 may include the plurality of pole pieces 310 which are arranged with a uniform angular interval in the circumferential direction. In particular, the plurality of pole pieces 310 may be formed to extend in the radial direction with respect to the rotation axis Ax to allow both inner and outer ends thereof to overlap at least a portion of the first magnet unit 100 and the second magnet unit 200 in the radial direction with respect to the rotation axis Ax.

In the another exemplary embodiment of the present disclosure, each of the plurality of pole pieces 310 may have a shape defined with respect to a predetermined angular range about the rotation axis Ax. Circumferential sides of each of the plurality of pole pieces 310 may be formed to extend along the radial direction such that a portion of both circumferential sides correspond to the boundary lines on both sides of the angular range and other portion is offset from the boundary lines on both sides of the angular range. This configuration may remove an area having a relatively low magnetic flux density so that a weight may be reduced, and a magnetic flux density may be prevented from saturating in a region where a magnetic flux density is relatively high, and thereby a smoother magnetic flux flow may be achieved.

In other words, a circumferential width of each of the plurality of pole pieces 310 between both circumferential sides may be increased in a region having a higher magnetic flux density, while it is decreased in a region having a lower magnetic flux density. Therefore, such configuration may reduce the overall weight while allowing a smoother flow of magnetic flux to improve a transmission torque.

Specifically, since each of the plurality of pole pieces 310 has a relatively low magnetic flux density near both inner end and outer end, a portion may be removed at both the inner and the outer ends of each of the plurality of pole pieces 310 so that the circumferential width between both sides is reduced. On the other hand, since a magnetic flux density is relatively high at a middle portion of each of the plurality of pole pieces 310, the circumferential width between both sides may be expanded at the middle of each of the plurality of pole pieces 310. Therefore, while allowing a smoother magnetic flux flow, the overall weight may be reduced.

Figure 11:
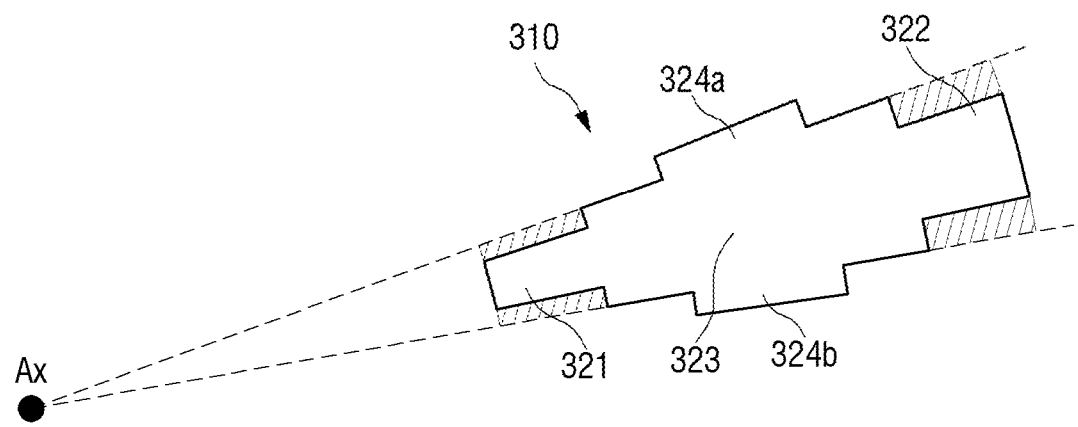
FIG. 11 is a schematic view showing a pole piece according to the another exemplary embodiment of the present disclosure.

FIG. 11 is a schematic view showing a pole piece according to the another exemplary embodiment of the present disclosure. Referring to FIG. 11, each of the plurality of pole pieces 310 according to the another exemplary embodiment of the present disclosure may have a shape defined with reference to a predetermined angular range with respect to the rotation axis Ax. Some portion of both an inner end 321 and an outer end 322 of each of the plurality of pole pieces 310 may be partially removed as shown with the hatch marks in FIG. 11 such that both circumferential sides are disposed inside the boundary lines (dashed line) of the angular range in the circumferential direction. A middle portion 323 of each of the plurality of pole pieces 310 may be formed with protrusions 324a and 324b that protrude circumferentially outward with respect to the boundary lines of the angular range on at least a portion of both circumferential sides.

Therefore, each of the plurality of pole pieces 310 may be formed to have a step shape such that the circumferential width between both circumferential sides may be increased going from the inner end 321 to the middle portion 323 and decreased going from the middle portion 323 to the outer end 322. Accordingly, a cross-sectional area of the middle portion 323 where a magnetic flux is concentrated may be increased. As a result, saturation of a magnetic flux density may be prevented in the middle portion 323 of each of the plurality of pole pieces 310, thereby improving the magnetic flux to flow more smoothly.

As described above, each of the plurality of pole pieces 310 may enable smoother magnetic flux flow when the circumferential width between both sides increases going from the inner end 321 to the middle portion 323 and decreased going from the middle portion 323 to the outer end 322. Accordingly, not only the strength of the transmission torque between the first magnet unit 100 and the second magnet unit 200 may be improved, but also the ripple of the transmission torque may be reduced.

Figure 12:
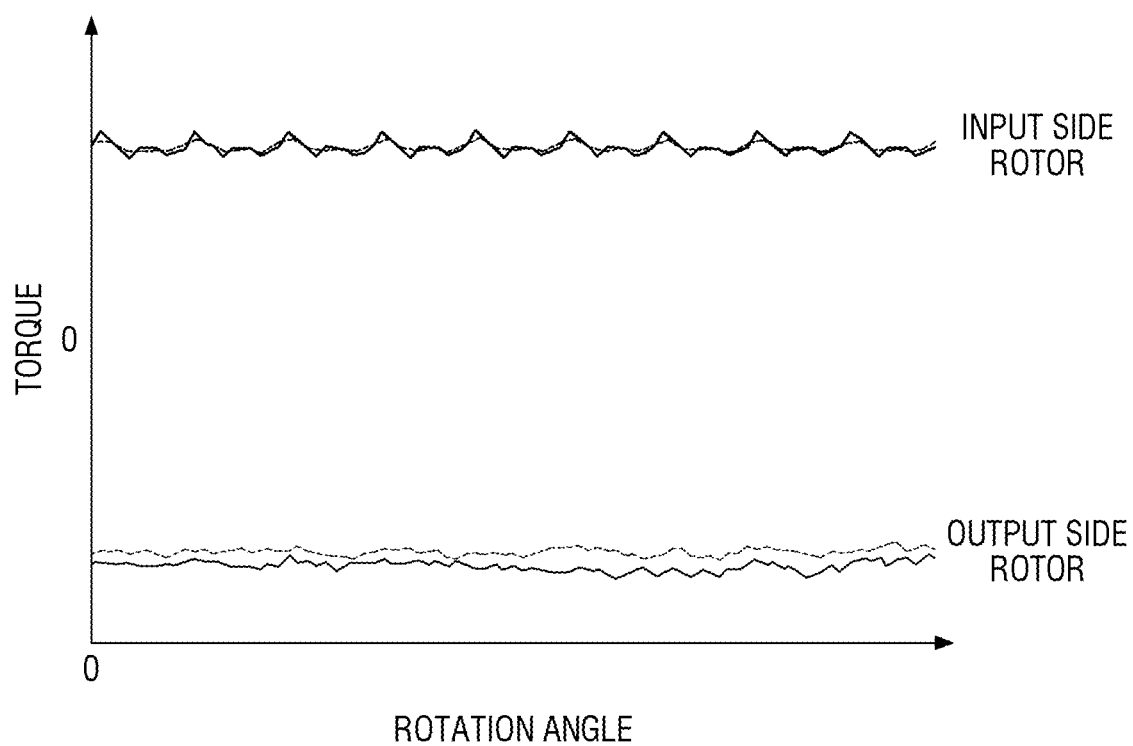
FIG. 12 is a schematic view showing a torque by the magnet gear device according to the another exemplary embodiment of the present disclosure.

In other words, referring to FIG. 12, compared to a case where a shape of the pole piece is as shown in FIG. 7, when a shape of each of the plurality of pole pieces 310 is as shown in FIG. 11 to improve the saturation phenomenon of the magnetic flux density, the transmission torque, i.e., a strength of an output side torque is improved, and a ripple of an input/output torque is reduced, allowing a more stable torque to be generated.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:
1. A magnet gear device, comprising:
a first magnet unit in which two or more magnetic poles are alternately arranged in a direction along a rotation axis and a circumferential direction with respect to the rotation axis, respectively;
a second magnet unit in which two or more magnetic poles are alternately arranged in the direction along the rotation axis and the circumferential direction, respectively, wherein the second magnet unit is disposed radially outside of the first magnet unit along an outer circumference of the first magnet unit; and
a pole piece unit including a plurality of pole pieces to form a magnetic flux path between the first magnet unit and the second magnet unit,
wherein each of the plurality of pole pieces is formed to extend in a radial direction with respect to the rotation axis to allow each of an inner end and an outer end thereof to overlap at least a portion of the first magnet unit and the second magnet unit,
wherein each of the plurality of pole pieces comprises a pair of magnetic bodies that extend in the radial direction with respect to the rotation axis, and wherein the pair of magnetic bodies are disposed on both sides of the first magnet unit and the second magnet unit in the direction along the rotation axis, respectively.

2. The device of claim 1, wherein each of the plurality of pole pieces has a shape defined with respect to a predetermined angular range about the rotation axis.

3. The device of claim 2, wherein a circumferential width between both circumferential sides of each of the plurality of pole pieces is smaller at the inner end proximate to the rotation axis than the outer end distant from the rotation axis.

4. The device of claim 3, wherein the circumferential width between the both circumferential sides of each of the plurality of pole pieces gradually increases from the inner end proximate to the rotation axis to the outer end distant from the rotation axis.

5. The device of claim 3, wherein the circumferential width between the both circumferential sides of each of the plurality of pole pieces increases from the inner end to a middle portion and from the outer end to the middle portion.

6. The device of claim 5, wherein at least one step is formed in each of the plurality of pole pieces to allow the circumferential width between the both circumferential sides to have a stepwise increase going from both the inner end and the outer end to the middle portion.

7. The device of claim 2, wherein both circumferential sides of each of the plurality of pole pieces are formed to correspond to boundary lines of both sides of the angular range.

8. The device of claim 2, wherein a portion of both circumferential sides of each of the plurality of pole pieces is formed to correspond to boundary lines of both sides of the angular range, and another portion thereof is formed to be offset from the boundary lines of the both sides of the angular range.

9. The device of claim 8, wherein, at the inner end and the outer end of each of the plurality of pole pieces, the both circumferential sides are disposed inside the angular range with respect to the boundary lines of the both sides of the angular range, and wherein a first part of the middle portion of each of the plurality of pole pieces is formed to correspond to the boundary lines of the both sides of the angular range, and a second part thereof is formed to protrude circumferentially outward with respect to the boundary lines of the both sides of the angular range.

10. The device of claim 2, wherein each of the plurality of pole pieces is formed such that both circumferential sides thereof are symmetrical with respect to a center line of the angular range.

11. The device of claim 1, wherein each of the plurality of pole pieces has a higher magnetic flux density at a middle portion than both the inner end and the outer end.

* * * * *